United States Patent
Zhang et al.

(10) Patent No.: US 12,556,280 B2
(45) Date of Patent: Feb. 17, 2026

(54) 6.4 TBPS SILICON-BASED PHOTONICS ENGINE TRANSCEIVER CHIP MODULE FOR HIGH-SPEED OPTICAL COMMUNICATION

(71) Applicant: ZHEJIANG LAB, Hangzhou (CN)

(72) Inventors: Qiang Zhang, Hangzhou (CN); Hui Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 571 days.

(21) Appl. No.: 18/134,573

(22) Filed: Apr. 14, 2023

(65) Prior Publication Data

US 2023/0253760 A1    Aug. 10, 2023

Related U.S. Application Data

(63) Continuation of application No. PCT/CN2021/123158, filed on Oct. 12, 2021.

(51) Int. Cl.
*H04B 10/43*     (2013.01)
*H01S 5/02*      (2006.01)
*H01S 5/0239*    (2021.01)

(52) U.S. Cl.
CPC .............. *H04B 10/43* (2013.01); *H01S 5/021* (2013.01); *H01S 5/0239* (2021.01)

(58) Field of Classification Search
CPC ........ H04B 10/43; H01S 5/0239; H01S 5/021
USPC ....................................................... 398/135
See application file for complete search history.

(56) References Cited

U.S. PATENT DOCUMENTS

| | | | |
|---|---|---|---|
| 10,009,668 B2* | 6/2018 | Liboiron-Ladouceur | H04B 10/801 |
| 11,057,113 B1* | 7/2021 | Xie | H04B 10/50 |
| 11,777,633 B2* | 10/2023 | Stojanovic | H04J 14/0209 398/45 |
| 12,455,423 B2* | 10/2025 | Nagarajan | G02B 6/4257 |
| 2015/0358083 A1 | 12/2015 | Doerr et al. | |

(Continued)

FOREIGN PATENT DOCUMENTS

| | | |
|---|---|---|
| CN | 102882601 A | 1/2013 |
| CN | 105515677 A | 4/2016 |

(Continued)

*Primary Examiner* — Dalzid E Singh
(74) *Attorney, Agent, or Firm* — Bayramoglu Law Offices LLC (57) ABSTRACT

A 6.4 Tbps silicon-based photonics engine transceiver chip module for high-speed optical communication manufactured based on processing techniques of semiconductors such as silicon-on-insulator (SOI) and indium phosphide (InP). The photonics engine transceiver chip module uses a silicon photonic chip as a substrate, and optical chips of an InP laser and an optical amplifier are heterogeneously integrated with the silicon photonic chip through bonding or flip-chip soldering. As a pump light source, the laser generates a soliton-based optical frequency comb by using an ultra-low loss silicon nitride (SiN) resonator cavity, and can be used as a multi-wavelength laser. This reduces use of a single-wavelength laser chip, reduces a power consumption and heat conduction of a laser in an optical chip of a photonic engine, and improves an integration level of an optical device. The optical frequency comb generates an optical carrier with wide bandwidth coverage and a large quantity of wavelengths.

6 Claims, 4 Drawing Sheets

(56) References Cited

U.S. PATENT DOCUMENTS

| | | | |
|---|---|---|---|
| 2016/0036550 A1 | 2/2016 | Welch | |
| 2016/0057516 A1 | 2/2016 | Hochberg et al. | |
| 2016/0204891 A1* | 7/2016 | Kato | H04B 10/43 398/79 |
| 2018/0306991 A1* | 10/2018 | Epitaux | G02B 6/138 |
| 2020/0021384 A1 | 1/2020 | Stojanovic et al. | |
| 2022/0029379 A1* | 1/2022 | Kovsh | H01S 5/50 |

FOREIGN PATENT DOCUMENTS

| | | |
|---|---|---|
| CN | 107294606 A | 10/2017 |
| CN | 108347283 A | 7/2018 |
| CN | 208656776 U | 3/2019 |
| CN | 111711064 A | 9/2020 |
| CN | 112003648 A | 11/2020 |

\* cited by examiner

6.4 TBPS SILICON-BASED PHOTONICS ENGINE TRANSCEIVER CHIP MODULE FOR HIGH-SPEED OPTICAL COMMUNICATION

CROSS-REFERENCE TO THE RELATED APPLICATION

This application is a continuation of PCT/CN2021/123158 filed on Oct. 12, 2021, the entire content of which is incorporated herein by reference.

TECHNICAL FIELD

The present disclosure relates to a 6.4 Tbps silicon-based photonics engine transceiver chip module for high-speed optical communication, and in particular, to a photonic integrated chip with a variety of different material platforms.

BACKGROUND

With the development and application of cloud computing, big data, artificial intelligence, the Internet of Things (IoT), the industrial Internet, and other technologies, there are increasing demands for data processing, computing, storage, and transmission. Traffic driven by industry digitalization and enterprise cloudification is growing exponentially. It is estimated that global Internet Protocol (IP) traffic will reach 175 ZB in 2025. As a computing infrastructure, a hyper-scale data center (HDC) carries operation of a new generation of technologies and platforms by using an edge node, a new server, new storage, power supply, cooling, and other technologies. As well as modular, prefabricated, and other construction methods, and has become a key hub of a global data network. Based on the report of Arizton, it is estimated that a global market size of the HDC will reach US $127.64 billion in 2026, and the market will keep growing at a compound annual growth rate of more than 4.02%. By the end of the second quarter of 2020, there were a total 541 HDCs in the world, of which China accounts for 9%.

Construction and upgrading of a data center will increase a demand for a switch system with a higher data throughput and a lower energy consumption. In order to meet a demand that a bandwidth growth of the data center annually exceeds 50%, an application-specific integrated circuit (ASIC) chip of an ethernet switch keep pace with an optical module in terms of a unit capacity cost, bandwidth density, and energy efficiency. With strong flexibility, strong interoperability, and rich multi-vendor ecosystems, a panel-type pluggable optical module (fiber-optic patch panel (FPP)) is most widely deployed in the data center. Based on an input/output (I/O) architecture of a switch of the pluggable optical module, high-speed data exchange between switches is completed by a pluggable optical module installed on a front panel and an integrated circuit (IC) port of a serializer/deserializer (SerDes) of an electric switching chip is routed to an interface of the optical module on the front panel through a printed circuit board (PCB) high-frequency routing. Since 2010, both a capacity of the ASIC chip and a capacity of the optical module have increased by 40 times. The ASIC chip of the switch follows the Moore's law, and its bandwidth has increased from 0.64 Tbps to 25.6 Tbps, which is doubled every two years. A bandwidth of the pluggable optical module has increased from 10 Gbps to 400 Gbps, which is quadrupled every four years. However, a bandwidth of a SerDes chip is doubled every 3 to 4 years, and it is necessary to increase a single-channel rate or quantity by using a high-speed parallel (scale out) technology, to make a switching capacity increase synchronously.

At present, 40 G and 100 G pluggable optical modules are mainly interconnected in the data center, which are gradually evolving to 400 G, 800 G, and 1.6 T pluggable optical modules. As the rate of the switch increases rapidly, use of the pluggable optical module is limited by a connector density, heat dissipation, signal integrity, and the like. Therefore, there is no pluggable optical module supporting a capacity of 800 G and beyond at present. In addition, efficiency of an I/O architecture of a switch based on a pluggable optical transceiver module is increasingly becoming a main bottleneck in further for improving the bandwidth density, and reducing the unit capacity cost and the energy efficiency. The photonics engine and the chip of the switch can be packaged on a same substrate by using a co-packaging technology without requiring RF cabling, a re-driver/re-timer, or other devices. It reduces the power consumption and increases the bandwidth of the switch continuously, such that it is expected to research and develop a next-generation high-speed optical switch with a high integration level, a low power consumption, and a low cost.

Most photonics engines are currently based on a coarse wavelength division multiplexing technology. For example, a 1.6 T photonics engine uses eight wavelengths (a single-wavelength transmission rate is 200 Gbps), and each wavelength corresponds to two lasers (one master laser and one slave laser). However, as the rate of the switch increases, a transmission rate of the photonics engine also needs to be doubled every two years. Therefore, the traditional coarse wavelength division multiplexing technology can no longer meet rate requirements of future 102.4 T and even 204.8 T switches. A dense wavelength division multiplexing technology based on an optical frequency comb will greatly improve a transmission rate of a single photonics engine. This not only greatly reduces a quantity of lasers used, but also reduces a power consumption and a volume of a single photonics engine, making a great contribution to achieving carbon neutrality.

SUMMARY

In order to overcome the shortcomings in the prior art, the present disclosure provides a 6.4 Tbps silicon-based photonics engine transceiver chip module for high-speed optical communication. The present disclosure will use a silicon photonic integration technology containing a silicon nitride (SiN) process to heterogeneously integrate an indium phosphide (InP)-based laser and a semiconductor optical amplifier (SOA). Based on a soliton-based optical frequency comb generated by an ultra-low loss SiN resonator cavity and a dense wavelength division multiplexing technology, an photonics engine chip with a transmission rate of 6.4 Tbps is designed, which greatly promotes practicality of an photonics engine transceiver chip with an ultra-high speed, a low consumption, and a small size.

At first, the present disclosure provides a 6.4 Tbps silicon-based photonics engine transceiver chip module for high-speed optical communication, including an optical transmitter chip and an optical receiver chip.

The optical transmitter chip includes two distributed-feedback (DFB) lasers, a 2×1 SiN optical switch, an ultra-low loss SiN micro-ring resonator cavity, an SOA, a SiN wavelength division demultiplexer (DMUX), 32 silicon photonic carrier-depletion modulators, a SiN wavelength division multiplexer (MUX), a Si—SiN waveguide transition structure, and a SiN fiber edge coupler.

The DFB laser and the SOA are integrated with a silicon photonic chip through bonding, the two DFB lasers are used as pump light sources of the ultra-low loss SiN micro-ring resonator cavity, the 2×1 SiN optical switch is used to perform switching between the two DFB lasers, an optical frequency comb (a series of optical carriers with an equal frequency spacing) is generated due to a nonlinear effect, namely, four-wave mixing, inside the ultra-low loss SiN micro-ring resonator cavity, and the SOA is arranged at an output end of the SiN resonator cavity to improve a link gain; the SiN wavelength division DEMUX selects an optical carrier in the optical frequency comb, and selects 32 optical frequency combs with a frequency spacing of 200 GHz as optical carriers; and the 32 optical carriers are modulated by 32 corresponding silicon photonic carrier-depletion modulators respectively, 32 modulated optical carriers are connected to the SiN wavelength division MUX through the Si—SiN waveguide transition structure to obtain one optical signal, and then the optical signal is coupled to a single-mode fiber through the SiN fiber edge coupler for transmission.

The optical receiver chip uses a silicon photonic chip as a substrate, and includes an InP-based SOA, a SiN wavelength division DEMUX, a Si—SiN waveguide transition structure, 32 GeSi photodetectors (GeSiPDs), and a SiN fiber edge coupler.

The InP-based SOA is integrated with the silicon photonic chip through bonding, an optical signal transmitted in a fiber is coupled to the optical receiver chip by the SiN fiber edge coupler, a link loss is amplified and compensated for by the InP-based SOA on the chip, the amplified optical signal is demultiplexed into 32 optical signals by the SiN wavelength division DEMUX, and the 32 optical signals are input to the corresponding GeSiPDs through the Si—SiN waveguide transition structure for direct intensity detection.

As a preferred solution of the present disclosure, the silicon photonic carrier-depletion modulator in the optical transmitter chip is a silicon-based carrier-depletion Mach-Zehnder modulator (MZM), a silicon-based carrier-depletion micro-ring modulator (MRM), or a GeSi electrical absorption modulator (EAM).

As a preferred solution of the present disclosure, the silicon photonic carrier-depletion modulator in the optical transmitter chip is modulated by using a 4-level, 6-level, or 8-level pulse amplitude modulation (PAM4, PAM6, or PAM8) format, a digital modulation rate is 200 Gbps, and the corresponding 32 optical carriers can achieve a total communication capacity of 6.4 Tbps.

As a preferred solution of the present disclosure, an amplification coefficient of the InP-based SOA in the optical receiver chip is 20 dB to 30 dB.

As a preferred solution of the present disclosure, the SiN wavelength division MUX and the SiN wavelength division DEMUX are SiN micro-ring resonator cavities, asymmetric Mach-Zender interferometers, or etched diffraction gratings.

As a preferred solution of the present disclosure, one of the two DFB lasers is a master DFB laser, and the other is a slave DFB laser; and when optical signal power of the master DFB laser meets a preset output threshold, the master DFB laser is started as the pump light source of the ultra-low insertion loss SiN micro-ring resonator cavity.

When the optical signal power of the master DFB laser is less than the preset output threshold, the slave DFB laser is started as the pump light source of the ultra-low insertion loss SiN micro-ring resonator cavity, and a thermal phase shifter of the 2×1 SiN optical switch is regulated and controlled, such that pump light output by the slave DFB laser is input to the ultra-low insertion loss SiN micro-ring resonator cavity.

Compared with the prior art, the photonics engine transceiver chip module uses the silicon photonic chip as the substrate, and optical chips of an InP laser and an optical amplifier are heterogeneously integrated with the silicon photonic chip through bonding or flip-chip soldering. As a pump light source, the laser generates a soliton-based optical frequency comb by using the ultra-low loss SiN resonator cavity, and therefore can be used as a multi-wavelength laser. This reduces use of a single-wavelength laser chip, reduces a power consumption and heat conduction of a laser in an optical chip of a photonic engine, and improves an integration level of an optical device. In addition, the optical frequency comb can generate an optical carrier with wide bandwidth coverage and a large quantity of wavelengths, such that a silicon-based photonics engine chip with a large communication capacity and based on wavelength division multiplexing can be realized.

A direct intensity modulation-monitoring method has a simple structure, a low cost, and other advantages. Therefore, based on an insertion loss, a bandwidth, modulation efficiency, and other performance of a current silicon-based modulator, the present disclosure uses the PAM4, PAM6, or PAM8 format to modulate the modulator, and the digital modulation rate is 200 Gbps. Therefore, the total communication capacity of 6.4 Tbps can be achieved by the corresponding 32 optical carriers.

In the present disclosure, most passive devices are made of SiN because of its low loss and very large optical power tolerance, which plays a significant role in reducing the link loss and improving the link gain. The modulator and the detector are made of a silicon-based material because a process platform of the silicon-based material can prepare high-speed modulation and detection devices, but the SiN does not have this function at present.

The present disclosure generates the optical frequency comb based on the DFB laser and the ultra-low loss SiN resonator cavity, which reduces use of too many lasers due to a wavelength division multiplexing technology, thus reducing a power consumption and heat conduction of the entire transmitter chip. The use of too many lasers will increase a size of the entire transmitter chip, which is very detrimental to miniaturization of the chip and the module.

DETAILED DESCRIPTION OF THE EMBODIMENTS

The present disclosure will be further described below in conjunction with the accompanying drawings and embodiments.

As shown in FIG. 1 to FIG. 6, a 6.4 Tbps silicon-based photonics engine transceiver chip module for high-speed optical communication according to an embodiment includes an optical transmitter chip (transmitter end) and an optical receiver chip (receiver end).

Figure 1:
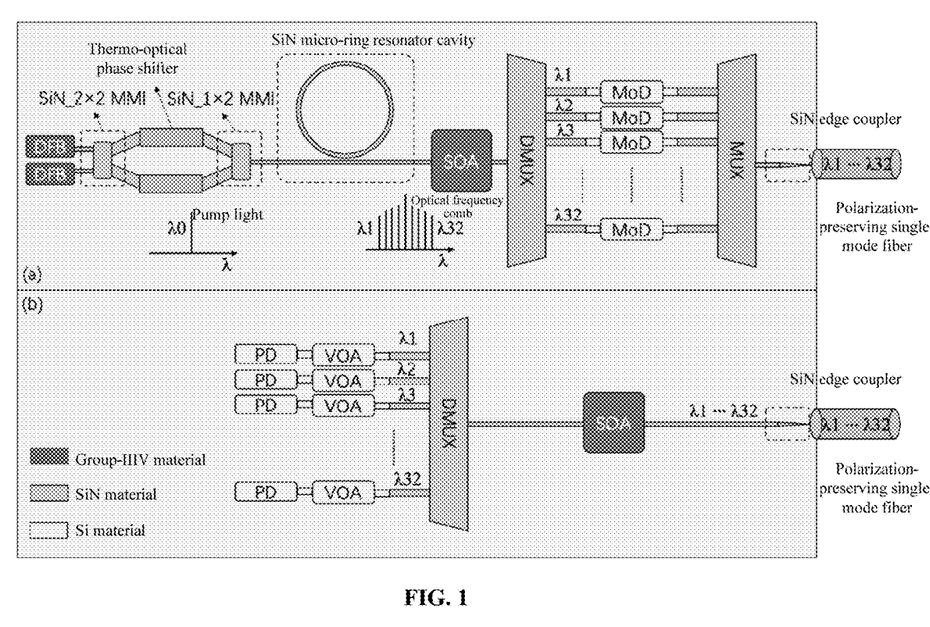
FIG. 1 is a schematic diagram of an photonics engine according to the present disclosure, where (a) is an transmitter end of the photonics engine and (b) is a receiver end of the photonics engine.

As shown in FIG. 1, a technical solution adopted by the present disclosure for an transmitter end of an photonics engine is to design and prepare an InP-based DFB laser and an InP-based SOA by using a silicon photonic chip as a substrate. The DFB laser and the SOA are integrated on the silicon photonic chip through bonding or flip-chip soldering, and are respectively used as pump light to excite an optical frequency comb and an optical amplifier to compensate for a loss of an optical link. An ultra-low insertion loss SiN micro-ring resonator cavity is designed and prepared. In addition, group velocity dispersion of a waveguide of the ultra-low loss SiN micro-ring resonator cavity is required to be very flat in a wide wavelength range, and the ultra-low loss SiN micro-ring resonator cavity can be used as a medium to nonlinearly generate the optical frequency comb based on optical four-wave mixing. The InP-based SOA amplifies power of the optical frequency comb in a required range to improve a gain of the optical link, thus improving a signal-to-noise ratio of the link and reducing a bit error rate. A SiN-based DMUX is designed and prepared to select required 32 optical carriers (λ 1 to λ 32) from the optical frequency comb.

Figure 5:
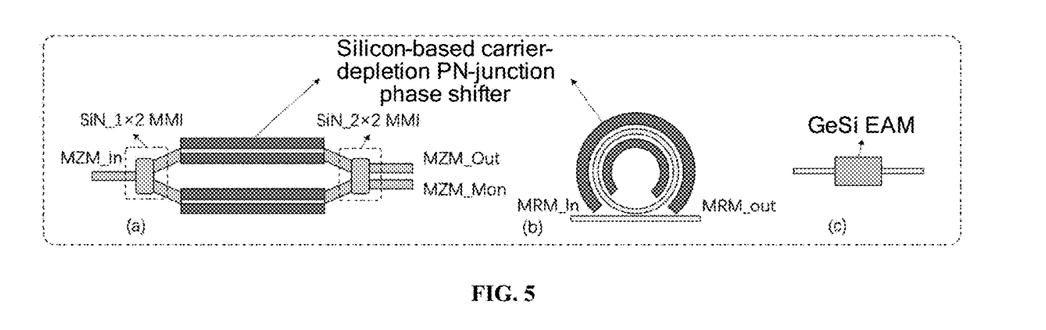
FIG. 5 schematically shows structures of a silicon-based carrier-depletion MZM, a silicon-based carrier-depletion MRM, and a GeSi EAM, where (a) is the structure of the silicon-based carrier-depletion MZM, (b) is the structure of the silicon-based carrier-depletion MRM, and (c) is the structure of the GeSi EAM.

A silicon photonic modulator with a low insertion loss, a large bandwidth, and a high modulation efficiency is designed and prepared. The silicon-based modulator may be a silicon-based carrier-depletion MZM, a silicon-based carrier-depletion MRM, or a GeSi EAM. In FIG. 5, (a) is a schematic structure of the silicon-based carrier-depletion MZM. In FIG. 5, (b) is a schematic structure of the silicon-based carrier-depletion MRM, and (c) is a schematic structure of the GeSi EAM. The silicon-based carrier-depletion MZM consists of a 1×2 SiN-based multimode-interferometer (MMI), one 2×2 SiN-based MMI, two carrier-depletion PN-junction modulation arms, and two silicon photothermal phase shifters. A resonator cavity of the silicon-based carrier-depletion MRM is divided into a modulation region and a heating region. The electrical signal modulation region realizes electro-optical modulation, and the heating region is generally used to control a working point of the MRM. In the electrical signal modulation region, the 32 optical carriers are modulated by respective silicon-based modulators. A driving electrical signal is a single-wavelength 200 Gbps PAM4 signal (or a PAM6 or PAM8 signal).

A SiN-based MUX and a SiN fiber edge coupler are designed and prepared. The SiN-based MUX combines these 32 modulated optical signals into one optical signal and couples the optical signal to a single-mode fiber through the SiN fiber edge coupler for transmission. The SiN-based 2×1 optical switch consists of one 2×2 SiN MMI, one 2×1 SiN-based MMI, and two thermo-optical phase shifters. A phase difference between upper and lower arms of the 2×1 optical switch is regulated and controlled to realize optical path switching between the two lasers.

As shown in (b) in FIG. 1, a technical solution adopted by the present disclosure for a receiver end of the photonics engine is as follows: an optical signal containing 32 different values of wavelengths is coupled to the receiver end of the photonics engine from the single-mode fiber through the SiN fiber edge coupler. An InP-based SOA at the receiver end of the photonics engine is configured to amplify the received optical signal, improve the signal-to-noise ratio of the link, and reduce the bit error rate. The amplified optical signal is demultiplexed into 32 optical signals by a SiN-based DMUX. An optical signal corresponding to each type of wavelength is coupled to a corresponding GeSiPD through a SiN—Si waveguide transition structure and demodulated into an electrical signal. The SiN fiber edge coupler, the optical switch, the MUX, and the DMUX can be used to improve an optical power tolerance, increase the signal-to-noise ratio of the link, and avoid optical nonlinearity of an optical device.

Figure 2:
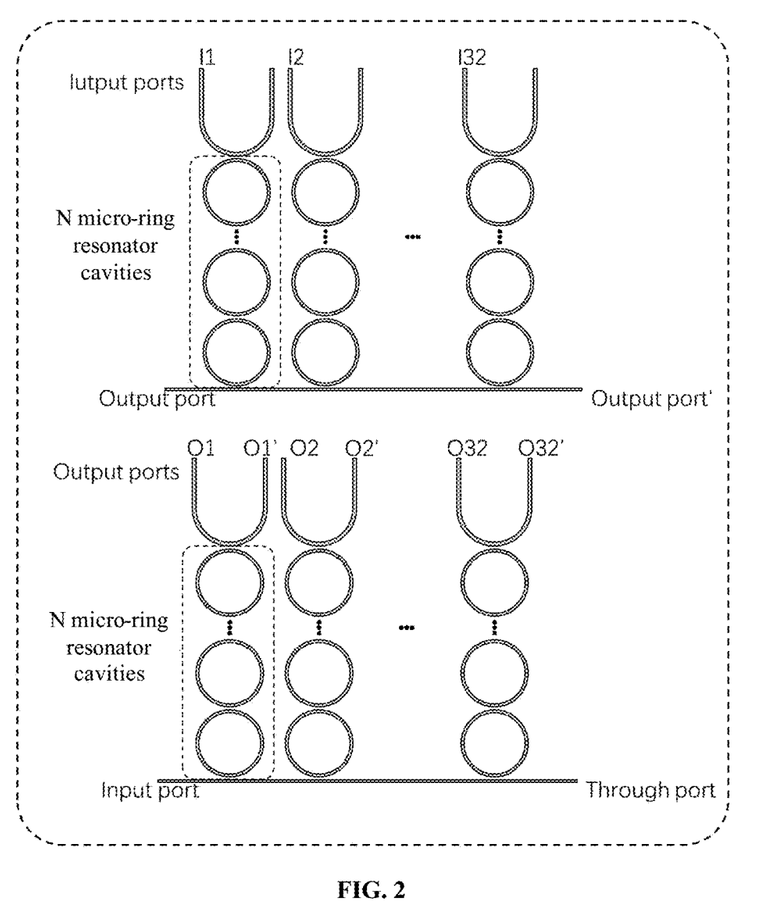
FIG. 2 schematically shows structures of a MUX and a DMUX that are realized by SiN cascaded micro-ring resonator cavities.
Figure 3:
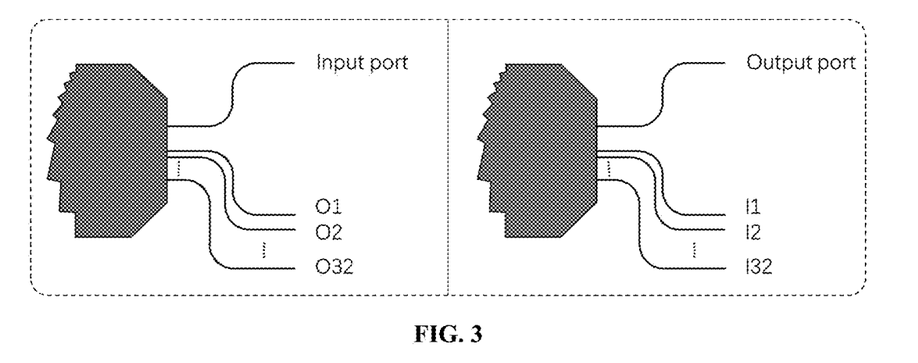
FIG. 3 schematically shows structures of a MUX and a DMUX that are realized by SiN etched diffraction gratings.
Figure 4:
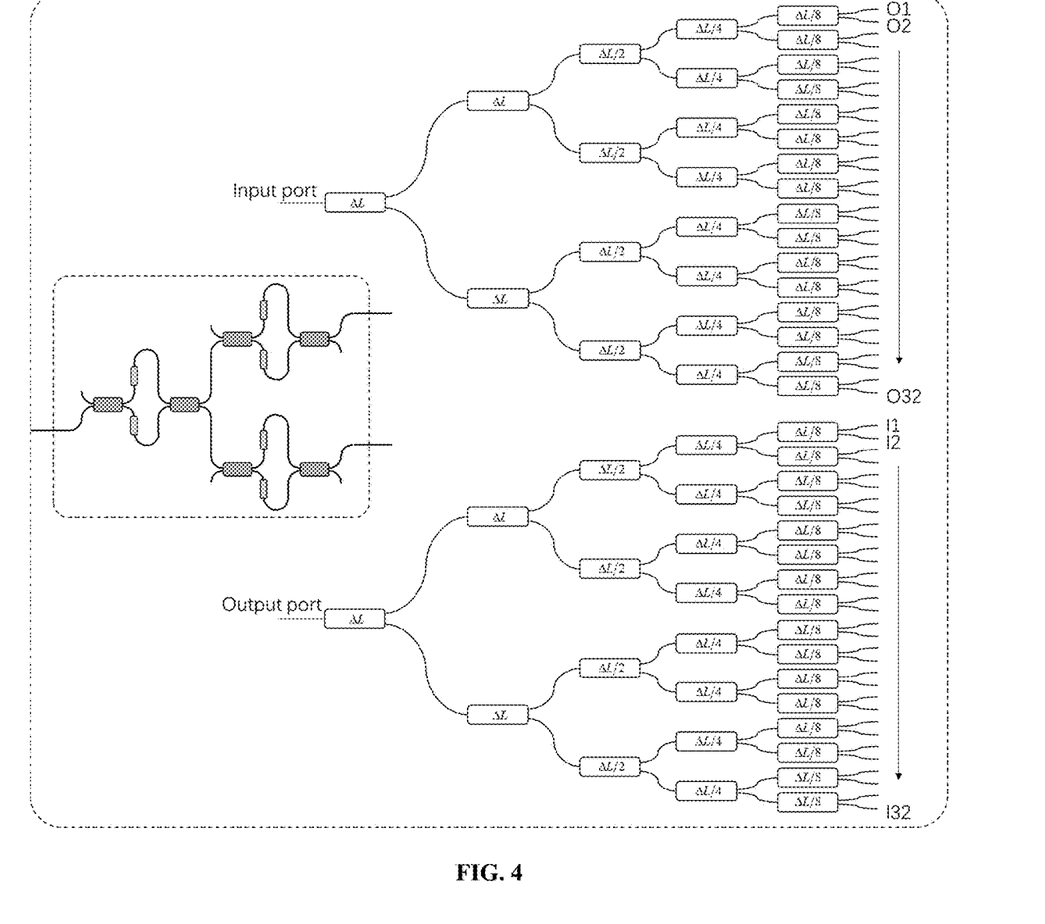
FIG. 4 schematically shows structures of a MUX and a DMUX that are realized by SiN grid filters.

The SiN-based MUX and DMUX in this embodiment may be realized by cascaded micro-ring resonator cavities, etched diffraction gratings, or grid filters. FIG. 2 schematically shows structures of a MUX and a DMUX that are realized by SiN cascaded micro-ring resonator cavities. FIG. 3 is a schematic structural diagram of a MUX and a DMUX that are realized by SiN etched diffraction gratings. FIG. 4 is a schematic structural diagram of a MUX and a DMUX that are realized by SiN grid filters.

Figure 6:
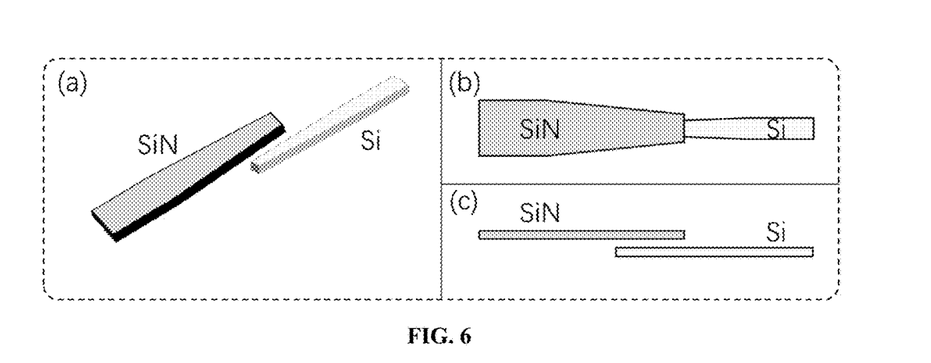
FIG. 6 is a schematic diagram of a Si—SiN waveguide transition structure.

Because the MUX is made of a SiN waveguide, and the silicon-based modulator is made of a silicon waveguide, optical waveguides made of two different materials need to be connected by using the SiN—Si waveguide transition structure. A silicon-based optical waveguide and a SiN waveguide are coupled by a Si—SiN waveguide transition structure or the SiN—Si waveguide transition structure. The Si—SiN waveguide transition structure in this embodiment is shown in FIG. 6. In FIG. 6, (a) is a three-dimensional structure of the Si—SiN waveguide transition structure. In FIG. 6, (b) is a top view. In FIG. 6, (c) is a cross section of the Si—SiN waveguide transition structure.

A working process of the 6.4 Tbps silicon-based photonics engine transceiver chip module for high-speed optical communication in the present disclosure is as follows:

1) At the transmitter end of the photonics engine, a driving voltage is applied to a master DFB laser, such that pump light generated by the master DFB laser is input to the SiN resonator cavity through the SiN optical switch, and an optical frequency comb with a frequency spacing of 200 GHz is generated nonlinearly through four-wave mixing. Once the master DFB laser cannot work normally due to a working life and other reasons (optical signal power is less than a preset output threshold), a peripheral feedback control circuit starts a slave DFB laser, and regulates and controls a thermal phase shifter of the optical switch, such that pump light output by the slave DFB laser is input to the SiN micro-ring resonator cavity.
2) A peripheral temperature control circuit performs feedback control on a temperature of the SiN resonator cavity to enable the SiN resonator cavity to produce a stable optical frequency comb.
3) A driving voltage is applied to the InP-based SOA to amplify power of the generated optical frequency comb, so as to improve the signal-to-noise ratio of the optical link and reduce a bit error rate of a signal.
4) The SiN-based DMUX selects required 32 optical carriers in the optical frequency comb.

5) Each corresponding optical carrier is modulated by an electrical signal through a corresponding silicon-based modulator.
6) 32 adjusted optical signals are combined into one optical signal, and the optical signal is coupled to the single-mode fiber through the SiN fiber edge coupler for transmission.
7) The 32 optical signals are coupled to the receiver end of the photonics engine through the SiN-based fiber edge coupler and amplified by the InP-based SOA to which the driving voltage is applied, to improve the signal-to-noise ratio and reduce the bit error rate.
8) The amplified optical signal containing 32 types of optical carriers is demultiplexed by the SiN-based DMUX, and then the corresponding GeSiPD performs direct intensity detection, and the corresponding electrical signal is obtained through demodulation.

A traveling wave electrode of the modulator and the PN-junction phase shifter are designed, such that operating bandwidths of the silicon photonic modulator and the GeSiPD can reach 40 GHz or above, and a high extinction ratio and a low power consumption are achieved. Based on this performance, the transmitter end in the present disclosure uses PAM-4/6/8 and other PAM formats, and the receiver end uses a direct intensity detection demodulation method. In this way, a transmission rate of 200 Gbps can be achieved for a single wavelength. Therefore, a chip at the transmitter end can achieve a total transmission rate of 6.4 Tbps by using the 32 optical carriers, and a chip at the receiver end can achieve a demodulation rate of 6.4 Tbps. In other words, a 6.4 Tbps silicon-based photonics engine transceiver chip module is achieved.

The above embodiments are merely several implementations of the present disclosure. Although the description is specific and detailed, it should not be construed as a limitation to the patent scope of the present disclosure. It should be noted that those of ordinary skill in the art can further make several variations and improvements without departing from the conception of the present disclosure. These variations and improvements all fall within the protection scope of the present disclosure. Therefore, the protection scope of the present disclosure shall be subject to the appended claims.

What is claimed is:

1. A 6.4 Tbps silicon-based photonics engine transceiver chip module for high-speed optical communication, comprising an optical transmitter chip and an optical receiver chip, wherein the optical transmitter chip comprises two distributed-feedback (DFB) lasers, a 2×1 silicon nitride (SiN) optical switch, an ultra-low loss SiN micro-ring resonator cavity, a semiconductor optical amplifier (SOA), a SiN wavelength division demultiplexer (DEMUX), 32 silicon photonic carrier-depletion modulators, a SiN wavelength division multiplexer (MUX), a Si—SiN waveguide transition structure, and a SiN fiber edge coupler;

the DFB laser and the SOA are integrated with a silicon photonic chip through bonding, the two DFB lasers are used as pump light sources of the ultra-low loss SiN micro-ring resonator cavity, the 2×1 SiN optical switch is used to perform switching between the two DFB lasers, an optical frequency comb is generated due to a nonlinear four-wave mixing effect inside the ultra-low loss SiN micro-ring resonator cavity, and the SOA is arranged at an output end of the SiN resonator cavity to improve a link gain; the SiN wavelength division DEMUX selects an optical carrier in the optical frequency comb, and selects 32 optical frequency combs with a frequency spacing of 200 GHz as optical carriers; and the 32 optical carriers are modulated by 32 corresponding silicon photonic carrier-depletion modulators respectively, 32 modulated optical carriers are connected to the SiN wavelength division MUX through the Si—SiN waveguide transition structure to obtain one optical signal, and then the optical signal is coupled to a single-mode fiber through the SiN fiber edge coupler for transmission;

the optical receiver chip uses a silicon photonic chip as a substrate, and comprises an indium phosphide (InP)-based SOA, a SiN wavelength division DEMUX, a Si—SiN waveguide transition structure, 32 GeSi photodetectors (GeSiPDs), and a SiN fiber edge coupler; and the InP-based SOA is integrated with the silicon photonic chip through bonding, an optical signal transmitted in a fiber is coupled to the optical receiver chip by the SiN fiber edge coupler, a link loss is amplified and compensated for by the InP-based SOA on the chip, the amplified optical signal is demultiplexed into 32 optical signals by the SiN wavelength division DEMUX, and the 32 optical signals are input to the corresponding GeSiPDs through the Si—SiN waveguide transition structure for direct intensity detection.

2. The 6.4 Tbps silicon-based photonics engine transceiver chip module for high-speed optical communication according to claim 1, wherein the silicon photonic carrier-depletion modulator in the optical transmitter chip is a silicon-based carrier-depletion Mach-Zehnder modulator (MZM), a silicon-based carrier-depletion micro-ring modulator (MRM), or a GeSi electrical absorption modulator (EAM).

3. The 6.4 Tbps silicon-based photonics engine transceiver chip module for high-speed optical communication according to claim 1, wherein the silicon photonic carrier-depletion modulator in the optical transmitter chip is modulated by using a 4-level, 6-level, or 8-level pulse amplitude modulation (PAM4, PAM6, or PAM8) format, a digital modulation rate is 200 Gbps, and the corresponding 32 optical carriers achieve a total communication capacity of 6.4 Tbps.

4. The 6.4 Tbps silicon-based photonics engine transceiver chip module for high-speed optical communication according to claim 1, wherein an amplification coefficient of the InP-based SOA in the optical receiver chip is 20 dB to 30 dB.

5. The 6.4 Tbps silicon-based photonics engine transceiver chip module for high-speed optical communication according to claim 1, wherein the SiN wavelength division MUX and the SiN wavelength division DEMUX are SiN micro-ring resonator cavities, asymmetric Mach-Zender interferometers, or etched diffraction gratings.

6. The 6.4 Tbps silicon-based photonics engine transceiver chip module for high-speed optical communication according to claim 1, wherein one of the two DFB lasers is a master DFB laser, and the other is a slave DFB laser; and when optical signal power of the master DFB laser meets a preset output threshold, the master DFB laser is started as the pump light source of the ultra-low loss SiN micro-ring resonator cavity; and when the optical signal power of the master DFB laser is less than the preset output threshold, the slave DFB laser is started as the pump light source of the ultra-low loss SiN micro-ring resonator cavity, and a thermal phase shifter of the 2×1 SiN optical switch is regulated and controlled, resulting pump light output by the slave DFB laser being input to the ultra-low loss SiN microring resonator cavity.

* * * * *